(12) United States Patent
Razavi

(10) Patent No.: US 6,800,707 B2
(45) Date of Patent: Oct. 5, 2004

(54) POLYOLEFIN PRODUCTION

(75) Inventor: Abbas Razavi, Mons (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/344,065

(22) PCT Filed: Aug. 7, 2001

(86) PCT No.: PCT/EP01/09260
§ 371 (c)(1),
(2), (4) Date: Dec. 4, 2003

(87) PCT Pub. No.: WO02/12358
PCT Pub. Date: Feb. 14, 2002

(65) Prior Publication Data
US 2004/0077805 A1 Apr. 22, 2004

(30) Foreign Application Priority Data
Aug. 7, 2000 (EP) ............................................. 00202787

(51) Int. Cl.$^7$ .................................................. C08F 4/42
(52) U.S. Cl. ...................... 526/160; 526/352; 526/943; 526/351; 502/103; 502/152; 556/1; 556/11; 556/27; 556/43; 556/53; 556/58
(58) Field of Search ................................. 526/160, 943, 526/351, 352; 502/103, 152; 556/1, 11, 27, 43, 53, 58

(56) References Cited

U.S. PATENT DOCUMENTS

| | | | |
|---|---|---|---|
| 5,132,381 A | 7/1992 | Winter et al. | |
| 5,401,817 A | 3/1995 | Palackal et al. | |
| 5,451,649 A | * 9/1995 | Zenk et al. | 526/160 |
| 5,571,880 A | * 11/1996 | Alt et al. | 526/160 |
| 5,710,222 A | 1/1998 | Ewen et al. | |
| 5,731,254 A | 3/1998 | Winter et al. | |

FOREIGN PATENT DOCUMENTS

| | | |
|---|---|---|
| EP | 0786466 A1 | 7/1997 |
| JP | 69394/92 | * 7/1990 |
| WO | WO 00/049029 | 8/2000 |

* cited by examiner

Primary Examiner—Ling-Siu Choi
(74) Attorney, Agent, or Firm—William D. Jackson

(57) ABSTRACT

Use of metallocene catalyst component for the preparation of a syndiotactic polyolefin having a monomer length of up to C10, which component has the general formula: $R''(C_pR_1R_2)(C_p'R_1'R_2')MQ_2$ wherein $C_p$ is a cyclopentadienyl ring; $C_p'$ is a 3,6 disubstituted fluorenyl ring; $R_1$ and $R_2$ are each independently H or a substituent on the cyclopentadienyl ring which is proximal to the bridge, which proximal substituent is linear hydrocarbyl of from 1 to 20 carbon atoms or a group of the formula $XR^*_3$ containing up to 7 carbon atoms in which X is chosen from Group IVA, and $R^*$ is the same or different and chosen from hydrogen or alkyl; $R_1'$ and $R_2'$ are each independently substituent groups on the fluorenyl ring, each of which is a group of the formula $AR'''_3$, in which A is chosen from Group IVA, and each $R'''$ is independently hydrogen or a hydrocarbyl having 1 to 20 carbon atoms; M is a Group IVB transition metal or vanadium; each Q is hydrocarbyl having 1 to 20 carbon atoms or is a halogen; R" is a structural bridge imparting stereorigidity to the component and comprises the moiety $TR_aR_b$, in which T is chosen from group IVA, and each of $R_a$ and $R_b$ is independently (i) substituted or unsubstituted aryl linked to T directly or by $C_1$–$C_4$ alkylene; or (ii) H.

21 Claims, 4 Drawing Sheets

Figure 1:
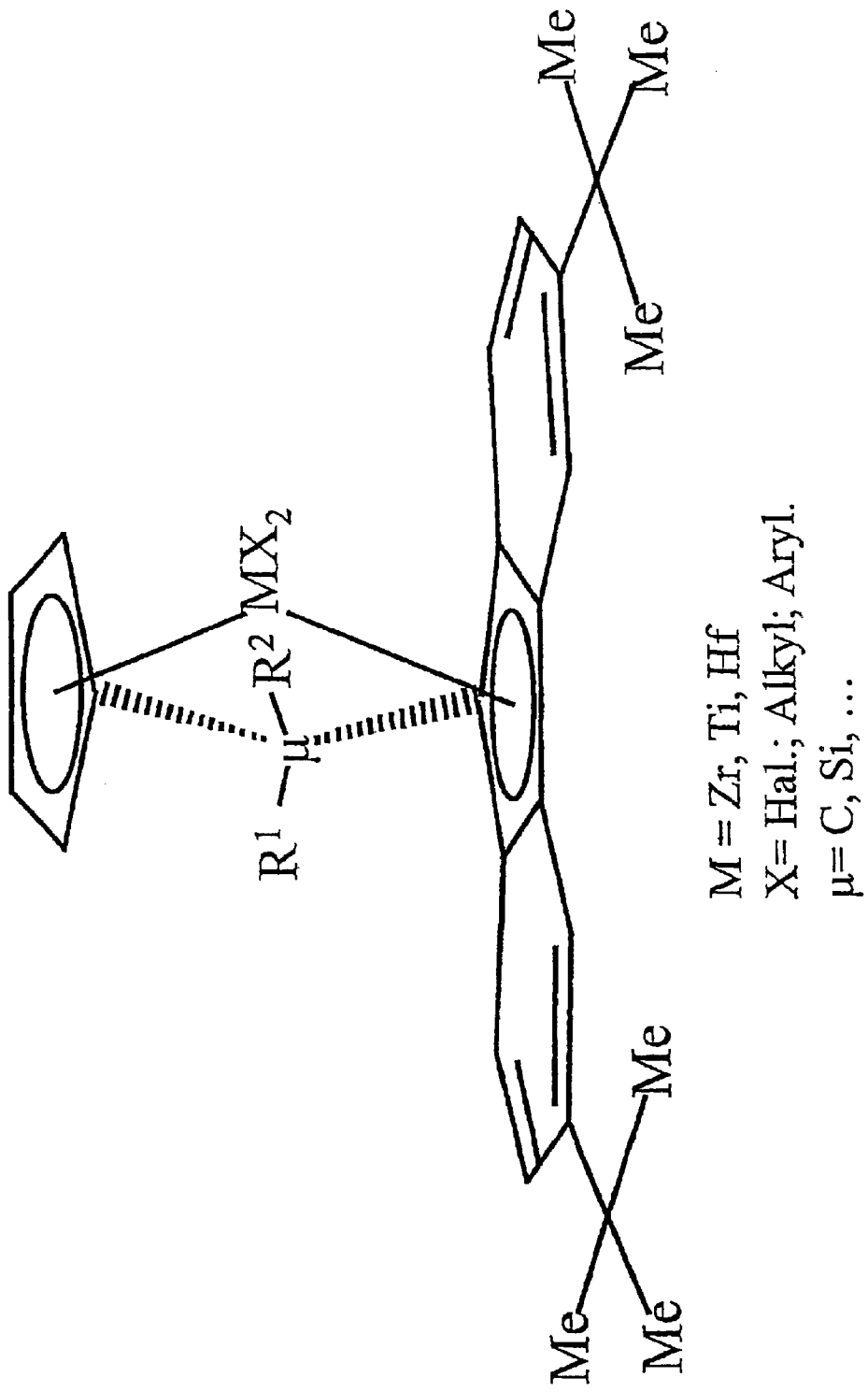

M = Zr, Ti, Hf
X = Hal.; Alkyl; Aryl.
μ = C, Si, ...

POLYOLEFIN PRODUCTION

FIELD OF THE INVENTION

The present invention relates to a metallocene catalyst component for use in preparing polyolefins, especially polypropylenes. The invention further relates to a catalyst system which incorporates the metallocene catalyst component and a process for preparing such polyolefins.

BACKGROUND TO THE INVENTION

Olefins having 3 or more carbon atoms can be; polymerised to produce a polymer with an isotactic stereochemical configuration. For example, in the polymerisation of propylene to form polypropylene, the isotactic structure is typically described as having methyl groups attached to the tertiary carbon atoms of successive monomeric units on the same side of a hypothetical plane through the main chain of the polymer. This can be described using the Fischer projection formula as follows:

Another way of describing the structure is through the use of NMR spectroscopy. Bovey's NMR nomenclature for an isotactic pentad is . . . mmmm with each "m" representing a "meso" diad or successive methyl groups on the same side in the plane.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is described as follows:

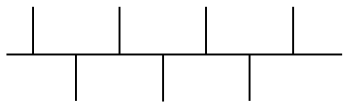

In NMR nomenclature, a syndiotactic pentad is described as . . . rrrr . . . in which "r" represents a "racemic" diad with successive methyl groups on alternate sides of the plane.

In contrast to isotactic and syndiotactic polymers, an atactic polymer exhibits no regular order of repeating unit. Unlike syndiotactic or isotactic polymers, an atactic polymer is not crystalline and forms essentially a waxy product.

While it is possible for a catalyst to produce all three types of polymer, it is desirable for a catalyst to produce predominantly an isotactic or syndiotactic polymer with very little atactic polymer.

EP-A-0426644 relates to syndiotactic copolymers of olefins such as propylene obtainable using as a catalyst component isopropyl (fluorenyl) (cyclopentadienyl) zirconium dichloride. Syndiotacticity, as measured by the amount of syndiotactic pentads, rrrr was found to be 73–80%.

EP-A-577581 discloses the production of syndiotactic polypropylenes using metallocene catalysts which have fluorenyl groups substituted in positions 2 and 7 and an unsubstituted cyclopentadienyl ring.

EP-A-0419677 describes the production of syndiotactic polypropylene with an object to produce resin compositions having high stiffness when moulded. Metallocene catalysts such as isopropyl(cyclopentadienyl-1-fluorenyl) zirconium dichloride were used in the production of the polypropylene. However the molecular weight, melting point and syndiotacticity of these products would generally be relatively low. Moreover, in certain applications where crystallinity and crystallisation rate of the desired resins are critical, these catalysts are not suitable.

Accordingly, there is a need to provide polyolefins, such as polypropylenes, with improved physical properties.

SUMMARY OF THE INVENTION

The present invention aims to overcome the disadvantages of the prior art.

In a first aspect, the present invention provides use of a metallocene catalyst component for the preparation of a syndiotactic polyolefin having a monomer length of up to C10, which component has the general formula:

$$R''(C_p R_1 R_2)(C_p' R_1' R_2')MQ_2 \qquad (I)$$

wherein $C_p$ is a cyclopentadienyl ring; $C_p'$ is a 3,6 di substituted fluorenyl ring; $R_1$ and $R_2$ are each independently H or a substituent on the cyclopentadienyl ring which is proximal to the bridge, which proximal substituent is linear hydrocarbyl of from 1 to 20 carbon atoms or a group of the formula $XR^*_3$ containing up to 7 carbon atoms in which X is chosen from Group IVA, and each $R^*$ is the same or different and chosen from hydrogen or alkyl; $R_1'$ and $R_2'$ are each independently substituent groups on the fluorenyl ring, each of which is a group of the formula $AR'''_3$, in which A is chosen from Group IVA, and each $R'''$ is independently hydrogen or a hydrocarbyl having 1 to 20 carbon atoms; M is a Group IVB transition metal or vanadium; each Q is hydrocarbyl having 1 to 20 carbon atoms or is a halogen; R'' is a structural bridge imparting stereorigidity to the component and comprises the moiety $TR_a R_b$, in which T is chosen from group IVA, and each of $R_a$ and $R_b$ is independently (i) substituted or unsubstituted aryl linked to T directly or by $C_1$–$C_4$ alkylene; or (ii) H.

Polyolefins produced using the metallocene catalyst component of the present invention are surprisingly found to have both very good microtacticity, especially as determined by pentad distribution levels in 13C nmr, and high weight average molecular weight, typically in excess of 500,000.

Without wishing to be bound by theory, it is thought that the combination in the present invention of an aromatic or hydrogen substituent on the bridge of the metallocene catalyst, in combination with disubstitution in positions 3 and 6 of the fluorenyl ring may contribute to an increase in the molecular weight, tacticity and crystallinity of the polymers, leading to improved mechanical properties of the final product.

The applicants have unexpectedly found that if in the metallocene catalysts the above substituent groups are present on the bridge and the fluorenyl ring is substituted in position 3 and 6, there is a significant improvement in the qualities of the produced polymer. Increases in microtacticity, melting point and molecular weight are all obtainable with these catalysts.

According to the present invention, the fluorenyl ring may be substituted by radicals of general formula: $AR'''3$ where A is preferably carbon or silicon and is more preferably carbon. Where A is carbon, $AR'''$ may be a hydrocarbyl selected from alkyl, aryl, alkenyl, alkyl aryl or aryl alkyl, such as methyl, ethyl, propyl, isopropyl, butyl, isobutyl, amyl, isoamyl; hexyl, heptyl, octyl, nonyl, decyl, cetyl or phenyl. Where A is silicon, $AR'''3$ may be $Si(CH3)3$. Preferably at least one of $R'_1$ and $R'_2$ is t-butyl. It is preferred that $R'_1$ and $R'_2$ are as similar as possible. More preferably both $R'_1$ and $R'_2$ are the same.

The structural bridge R" comprises the moiety $TR_aR_b$ in which T is directly or indirectly linked to Cp and Cp'. T may be indirectly linked to each of Cp and Cp' by $C_1$ to $C_4$ alkylene but it is preferred that T is C or Si linked directly to the two Cp rings. Where $R_a$ and/or $R_b$ is aryl, each aryl may be substituted or unsubstituted and may be heteroaryl. Preferred aryl groups include substituted or unsubstituted phenyl, naphthyl and anthracyl. $R_a$ and $R_b$ are preferably the same. Most preferably, R" is diphenylmethylidene.

M is preferably from Group IVB and may be hafnium, titanium or, most preferably, zironium. Q may be a hydrocarbyl such as alkyl, aryl, alkenyl, alkylaryl or aryl alkyl, preferably methyl, ethyl, propyl, isopropyl, butyl, isobutyl, amyl, isoamyl, hexyl, heptyl, octyl, nonyl, decyl, cetyl or phenyl. Q is preferably a halogen.

In the proximal substituent groups R1 and R2, X is preferably C or Si. R* is preferably H. It is preferred that R1 and R2 are the same.

$R_1$ and $R_2$ should each be sufficiently small as not to interfere with syndiotactic polyolefin production. Whilst linear hydrocarbyl substituents of up to 20 carbon atoms may be tolerated, it is preferred that $R_1$ and $R_2$ each have no more than 7 carbon atoms. With non-linear substituents each $R*_3$ is preferably no larger than methyl. X is preferably C or Si. It is particularly preferred that at least one and most preferably both of $R_1$ and $R_2$ are hydrogen. In this way, production of syndiotactic polyolefin is favoured.

Production of syndiotactic polyolefin is particularly favoured when the substituent groups in the metallocene molecule are chosen so that the molecule has $C_s$ symmetry or near $C_s$ symmetry. The closer to $C_s$ symmetry, the more favoured is syndiotactic polyolefin production. Accordingly, identity or near identity is preferred between the pairs of substituents; $R'_1$ and $R'_2$, $R_a$ and $R_b$, and $R_1$ and $R_2$.

In a further aspect, a catalyst system is used for preparing the polyolefins, which system comprises (a) a catalyst component as defined above; and (b) an aluminium- or boron-containing cocatalyst capable of activating the catalyst component. Suitable aluminium-containing cocatalysts comprise an alumoxane, an alkyl aluminium and/or a Lewis acid.

The alumoxanes usable in the process of the present invention are well known and preferably comprise oligomeric linear and/or cyclic alkyl alumoxanes represented by the formula:

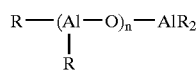 (I)

for oligomeric, linear alumoxanes and

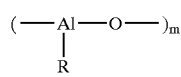 (II)

for oligomeric, cyclic alumoxane,
wherein n is 1–40, preferably 10–20, m is 3–40, preferably 3–20 and R is a C1–C8 alkyl group and preferably methyl. Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'-H]+[B Ar1 Ar2 X3 X4]— as described in EP-A-0277004 (page 6, line 30 to page 7, line 7).

The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene.

Preferably, the support is a silica having a surface area comprised between 200 and 1000 m2/g and a pore volume comprised between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the metallocene and alumoxane are dissolved in toluene prior to addition to the support material.

In a further aspect, the present invention provides use of a catalyst component as defined above and a cocatalyst which activates the catalyst component, for the preparation of polyolefins, preferably polypropylenes.

In a further aspect, the present invention provides a process for preparing polyolefins, especially polypropylenes, which comprises contacting a catalyst system as defined above with at least one olefin, preferably propylene, in a reaction zone under polymerisation conditions.

The catalyst component may be prepared by any suitable method known in the art. Generally, the preparation of the catalyst component comprises forming and isolating bridged substituted or unsubstituted cyclopentadienyl, which are then reacted with a halogenated metal to form the bridged metallocene catalyst.

In one embodiment, the process for preparing the bridged metallocene catalyst components comprises contacting the symmetrically substituted cyclopentadiene with a substituted fluorene under reaction conditions sufficient to produce a bridged Cp-fluorenyl. The process further comprises contacting the bridged Cp-fluorenyl with a metal compound of the formula MQk as defined above under reaction conditions sufficient to complex the bridged Cp-fluorenyl to produce a bridged metallocene wherein M and Q are each defined as above and $0 \leq k \leq 4$. The process step of contacting the bridged Cp-fluorenyl with a metal compound can be performed in a chlorinated solvent. The above process may also be carried out in the reverse order.

In a further embodiment, the process comprises contacting the cyclopentadiene with an alkyl silyl chloride of the formula $R_{-2}$ Si $Hal_2$ wherein R~ is a hydrocarbyl having 1 to 20 carbon atoms and Hal is a halogen. An equivalent of a substituted fluorene is added to produce a silicon bridged cyclopentadienyl-substituent fluorenyl ligand. The subsequent steps are similar to those above for producing a bridged substituted cyclopentadienyl-fluroenyl ligand coordinated to metals such as Zr, Hf and Ti. Again, the process may also be carried out in the reverse order.

In a further embodiment, the process comprises contacting the substituted cyclopentadiene with a fulvene producing agent such as acetone to produce a substituted fulvene. Subsequently, in a second step, the fulvene is reacted with a fluorene substituted in position 3 and 6, to produce a carbon bridged substituted cyclopentadienyl-fluorenyl ligand that will produce the desired metallocene catalysts after reacting with MCl4, in which M is Zr, Hf or Ti.

In a further aspect, the present invention provides a syndiotactic polyolefin having a monomer length of up to C10 and a pentad distribution (rrrr) typically comprising greater than 90%, advantageously at least 91.5%, more preferably at least 94%, and typically up to at least 98%.

The molecular weight (Mw) of the polyolefin is typically greater than 500,000, preferably at least 800,000, and typically up to at least 1,500,000 or 2,000,000.

The melting point of the polyolefin is typically at least 142° C., preferably at least 145° C., more preferably at least 149° C. and may typically be up to 165° C.

Figure 2:
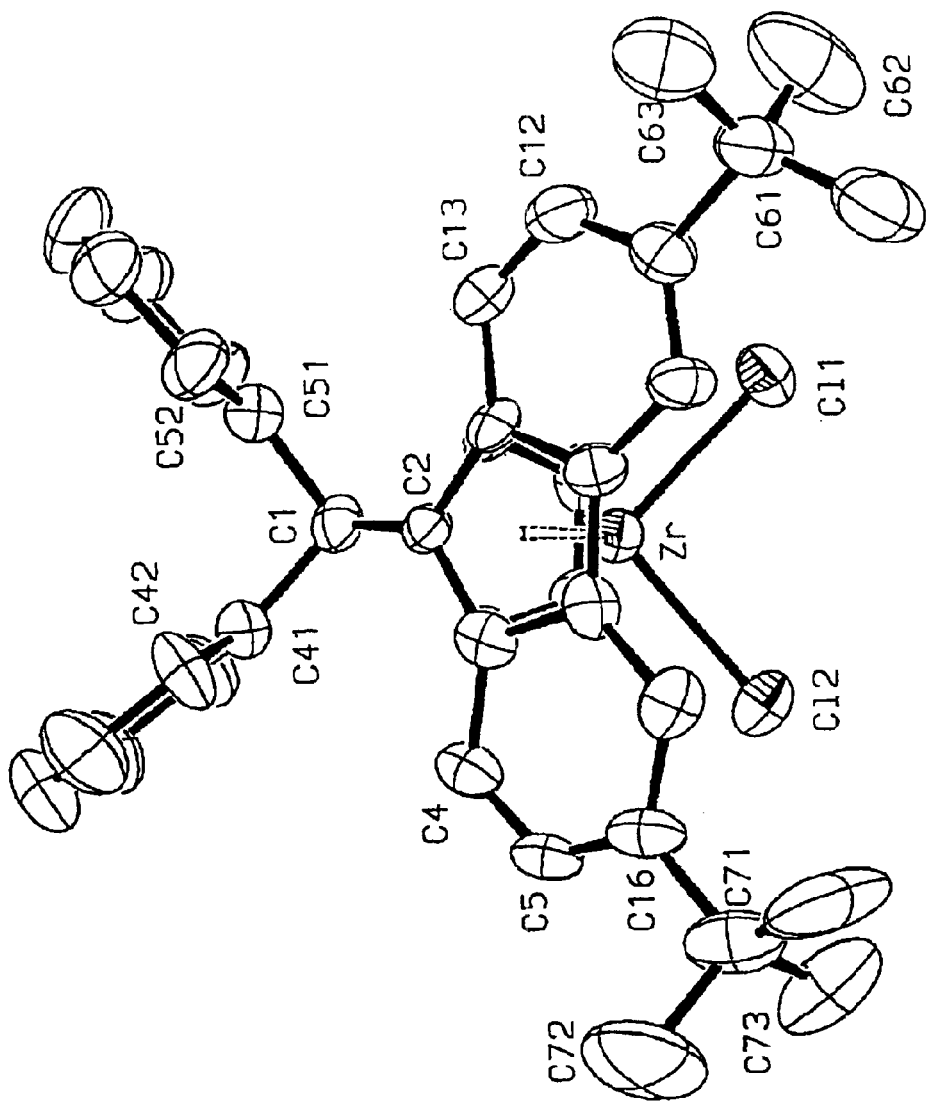
Figure 3:
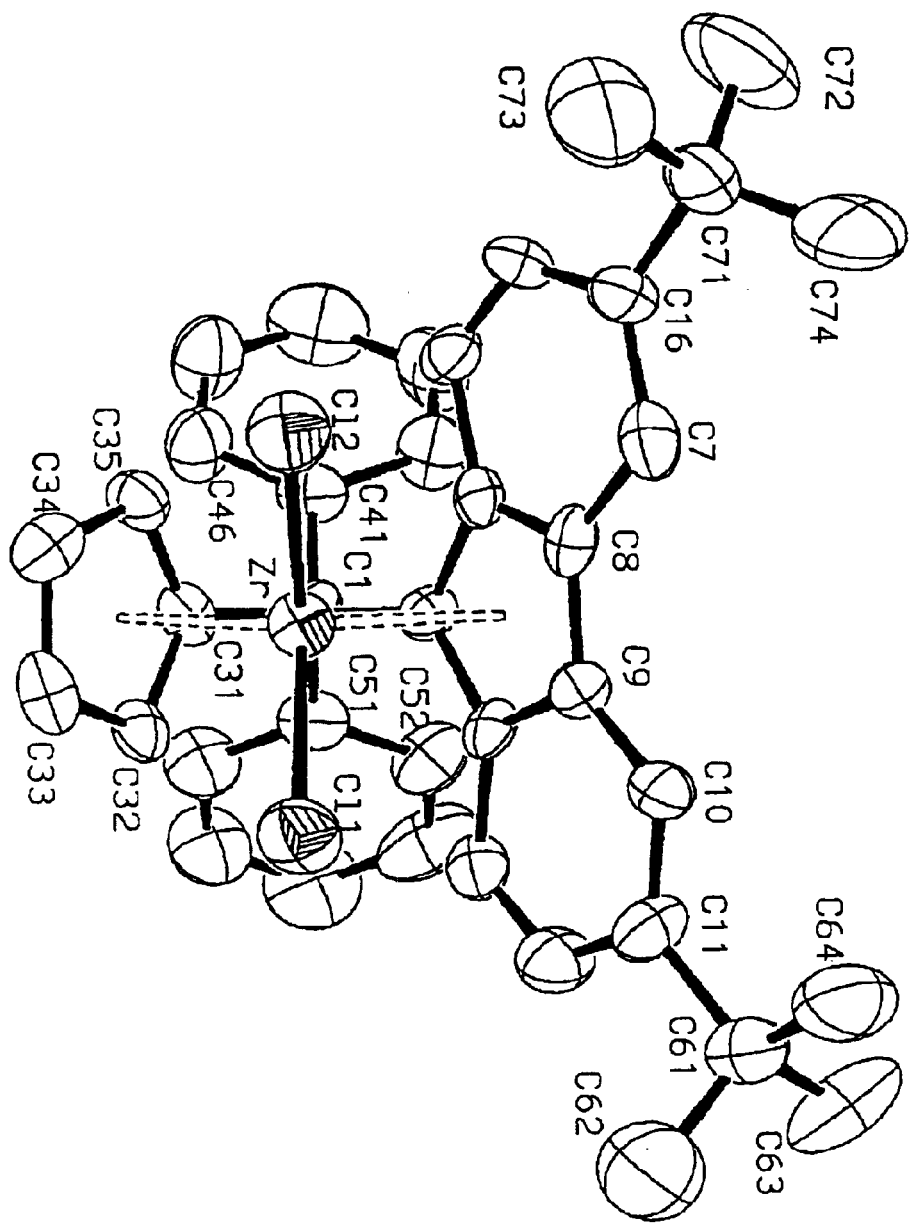
Figure 4:
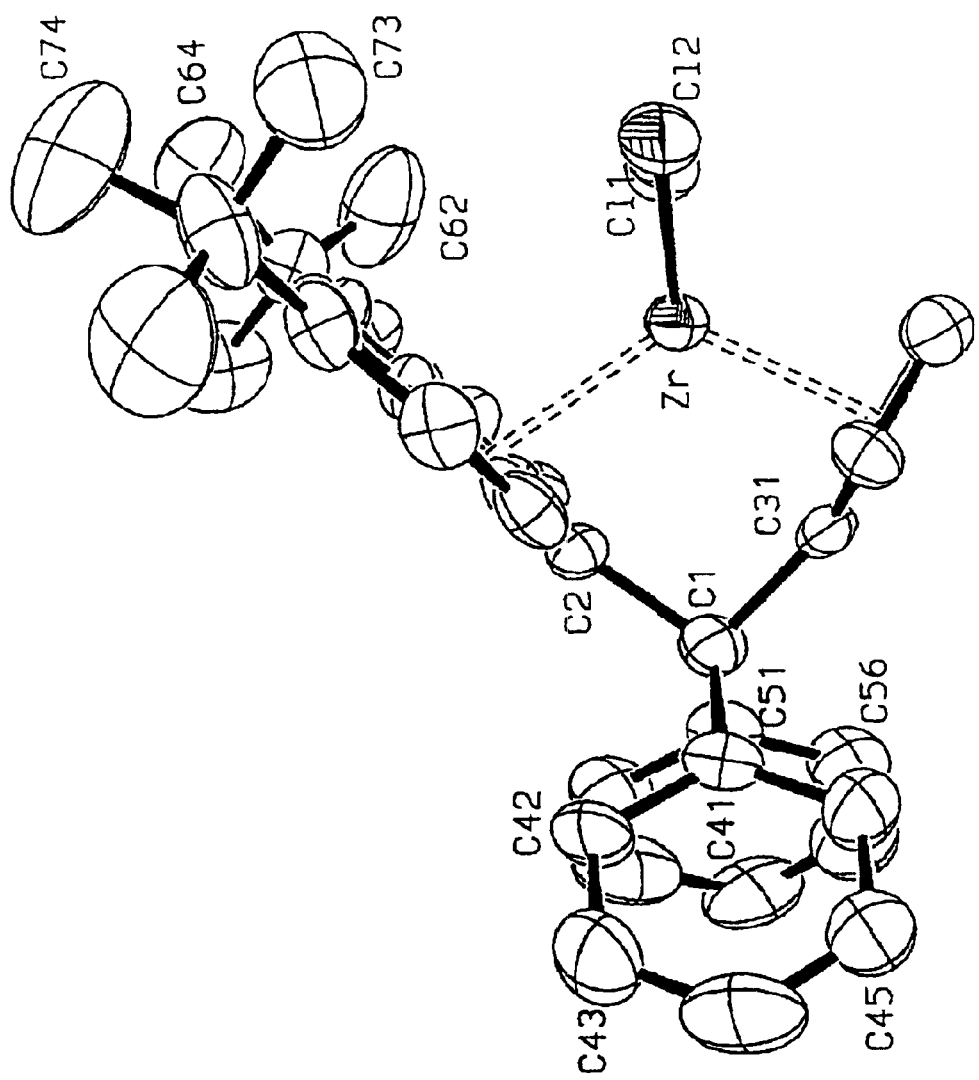

The invention will now be described in further detail, by way of example only, with reference to the attached drawings in which:

FIG. 1 shows an illustration of the structure of preferred catalyst components of the present invention; and FIGS. 2 to 4 show respectively views from the top, front and side of a particularly preferred catalyst component.

EXAMPLE 1

A. Preparation of 2,2 diphenyl-[(cyclopentadienyl)-(3,6-di-tertbutyl-fluorenyl)]-methylene Reaction

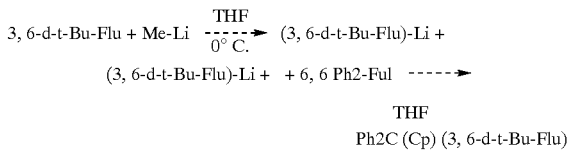

Procedure 1.5 g (5.387 mmol) of 3,6-d-t-Bu-Flu in 100 ml of dry tetrahydrofuran, is placed into a 250 ml flask, under N2 and the solution is pre-cooled to 0° C. The 3,6-d-t-Bu-Flu may be synthesised according to Shoji Kajigaeshi et al. Bull. Chem. Soc. Jpn. 59, 97–103(1986) or M Bruch et al. Liebigs Ann. Chem. 1976, 74–88. Then, a solution of 3.4 ml (5.387 mmol) of methyllithium is added drop wise to the solution.

The solution is red and is further continued at room temperature during 4 hours. After that, a solution of 1.2407 g (5.387 mmol) of 6,6 diphenylfulvene in 10 ml of dry tetrahydrofuran is added dropwise to this solution. The reaction is further continued during 24 hours. After adding 40 ml of saturated solution of NH4Cl in water, the yellow organic phase is separated and dried with MgSO4 anhydrous. The evaporation of the solvent leads to the isolation of 2.36 g (yield, 96.32%) of orange solid product.

B. Preparation of diphenylmethylidene [(cyclopentadienyl)-(3,6-di-tertbutyl-fluorenyl)]zirconium dichloride (1) Reaction

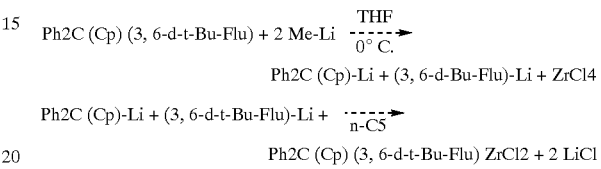

Procedure 2 g (4.398 mmol) of ligand is dissolved in 100 ml of dry tetrahydrofuran under N2, and the solution is pre-cooled to 0° C. A solution of 5.5 ml (8.796 mmol) of methyllithium (1.6 mol/diethyl ether) is added dropwise to this solution. After 3 hours, the solvent is removed in vacuum, the red powder is washed with 2×100 ml of pentane. The red dianion ligand and 100 ml of pentane are placed into a 250 ml flask, under N2. 1.02 g (4.398 mmol) of zirconium tetrachloride is added to this suspension. The reaction mixture is red-brown and stirred overnight in a glove box. After filtration, the orange solution is removed in vacuo at 40° C. and yielded 2.3 g (85.18%) of orange powder. Apparently, this metallocene is soluble in pentane.

EXAMPLE 2 (COMPARATIVE)

Preparation of isopropylidene [(cyclopentadienyl)-(3,6-di-tertbutyl-fluorenyl)]zirconium dichloride The synthetic procedure according to Example 1 is followed except that the ligand in step B is replaced by the 2,2-[(cyclopentadienyl)-(3,6-di-tertbutyl-fluorenyl)]-propane.

A. Preparation of 2,2-[(cyclopentadienyl)-(3,6-di-tertbutyl-fluorenyl)]-propane

Procedure

The preparation of this ligand is the same as that of Example 1, step A, but the 6,6 diphenylfulvene is replaced by 0.5720 g (5.387 mmol) of 6,6 dimethylfulvene.

EXAMPLE 3

Polymerisation Procedures

Each polymerisation was performed in a 4 litre bench reactor with pure propylene. Polymerisation was initiated by introducing metallocene (0.5 to 5 mg) precontacted with 1 ml of MAO (methylaluminoxane) (30% solution in toluene obtained from WITCO) three minutes prior to its introduction into the reactor.

Table 1 shows figures for production of syndiotactic polypropylene using as a catalyst component an isopropylidene bridged Cp,3,6t-butyl fluorenyl metallocene of Example 2 (comparative).

TABLE 1

Syndiotactic polypropylene made
using isopropylidene bridge catalysts

| Polymerisation temp | Mw (kD) | Mp° C. | Microtacticity (rrrr) |
|---|---|---|---|
| 30° C. | 250 | 152–154 | 92–94% |
| 40° C. | 200 | 150 | 90–92% |
| 60° C. | 170 | 145 | 88–90% |
| 80° C. | 140 | 142 | 86–88% |

Table 2 also relates to a comparative example. Figures are shown for production of syndiotactic polypropylene using as a catalyst component a diphenylmethylene bridged Cp,2,7 t-butyl fluorenyl metallocene, according to EP-A-0577581. In this comparative example, the fluorenyl ring is substituted at positions 2 and 7 and not at positions 3 and 6 in accordance with the present invention. Molecular weight and melting point are lower than corresponding values obtained with the present invention. Microtacticity values would therefore also be lower.

TABLE 2

Syndiotactic polypropylene made using
diphenylmethylidene bridge catalysts with
t-butyl substituents at positions 2 and 7 in fluorene.

| Polymerisation temp | Mw (kD) | Mp° C. |
|---|---|---|
| 30° C. | 671 | 144 |
| 50° C. | 440 | 139 |
| 60° C. | 370 | 137 |

Table 3 relates to an example according to the invention. Figures are shown for production of syndiotactic polypropylene using as a catalyst component a diphenylene methylidene bridged Cp,3,6 t-butyl fluorenyl metallocene of Example 1.

TABLE 3

Syndiotactic polyproylene made using diphenylmethylidene bridge
catalysts with t-butyl substituents at positions 3 and 6 in fluorene

| Polymerisation temp | Mw (kD) | Mp° C. | Microtacticity (rrrr) |
|---|---|---|---|
| 0°C. | 1500 | 160 | 96–98% |
| 20°C. | 1000 | 152–154 | 92–94% |
| 40°C. | 800 | 150 | 90–92% |
| 60°C. | 680 | 145 | 88–90% |
| 80°C. | 350 | 142 | 86–88% |

In a further polymerisation experiment under the same polymerisation conditions, as above the following results were obtained using the diphenylene methylidene catalyst of Example 1:

TABLE 4

| T Pol ° C. | Hydrogen | M12 | Activity | T (melt) | T (recry) | Mn | Mw | Mz | D | rrrr % |
|---|---|---|---|---|---|---|---|---|---|---|
| 60 | 0 | | 80,000 | 142.1 | 98.4 | 163,899 | 509,994 | 1,182,124 | 3.1 | 91.7 |
| 40 | 0 | | 76,811 | 149.8 | 99.6 | 286,075 | 809,729 | 1,892,027 | 2.8 | 94.1 |

What is claimed is:

1. A process for preparing a syndiotactic polyolefin having a monomer length of up $C_{10}$ which comprises:
    (a) contacting:
        1) a metallocene catalyst component having the general formula:

R"$(C_pR_1R_2)(C_p'R_1'R_2')$MQ$_2$ wherein Cp is a cyclopentadienyl ring; Cp' is a 3,6 di substituted fluorenyl ring; $R^1$ and $R^2$ are each independently H or a substituent on the cyclopentadienyl ring which is proximal to the bridge, provided that at least one of $R_1$ and $R_2$ is a proximal substituent, which proximal substituent is linear hydrocarbyl group of from 1 to 20 carbon atoms or a group of the formula XR*$_3$ containing up to 7 carbon atoms in which X is chosen from Group IVA, and each R* is the same or different and chosen from hydrogen or an alkyl group; $R_1$ and $R_2$ are each independently substituent groups on the fluorenyl ring, each of which is a group of the formula AR'''$_3$ in which A is chosen from Group IVA, and each R''' is independently hydrogen or a hydrocarbyl group having 1 to 20 carbon atoms; M is a Group IVB transition metal or vanadium; each Q is a hydrocarbyl group having 1 to 20 carbon atoms or is a halogen; R" is a structural bridge imparting stereorigidity to the component and comprises the moiety TRaRb, in which T is chosen from group IVA, and each of Ra and Rb is independently (i) a substituted or unsubstituted aryl linked to T directly or by a $C_1$–$C_4$ alkylene; or (ii) H; and
        2) an aluminum or boron containing co-catalyst component capable of activating the metallocene catalyst component; and
    (b) contacting the activated catalyst of subparagraph (a) with at least one olefin in a reaction zone under polymerization conditions to form a syndiotactic polyolefin having a monomer length of up to ten carbon atoms.

2. A process according to claim 1, wherein A is carbon or silicon.

3. A process according to claim 2, wherein AR'''$_3$ is hydrocarbyl group having from 1 to 20 carbon atoms.

4. A process according to claim 2, wherein AR'''$_3$ is C(CH$_3$)$_3$.

5. A process according to claim 1, wherein AR'''$_3$ is Si(CH$_3$)$_3$.

6. A process according to claim 1, wherein $R_1$' and $R_2$' are the same.

7. A process according to claim 1, wherein T is C or Si.

8. A process according to claim 7, wherein $R_a$ and $R_b$ are the same.

9. A process according to claim 1, wherein R" is diphenylmethylidene.

10. A process according to claim 9, wherein M is zirconium or titanium.

11. A process according to claim 10, wherein Q is halogen.

12. A process according to claim 11, wherein $R_1$ and $R_2$ are H.

13. A process according to claim 1, wherein the metallocene catalyst component comprises diphenylmethylidene-cyclopentadienyl 3,6 di t-butyl fluorenyl $ZrCl_2$.

14. A process according to claim 1, wherein the catalyst system further promises an inert support.

15. A process according to claim 1, wherein olefin is propylene.

16. A process for preparing a syndiotactic polyolefin by the polymerization of propylene which comprises:
   (a) contacting;
      1) a metallocene catalyst having the general formula $R''(C_p)(C_p')MQ_2$, wherein $C_p$ is a a cyclopentadienyl group which is substituted with at least one substituent which is proximal to the bridge R", which proximal substituent is linear hydrocarbyl group of from 1 to 20 carbon atoms or a group of the formula $XR^*_3$ containing up to 7 carbon atoms in which X is chosen from Group IVA, and each R* is the same or different and chosen from hydrogen or an alkyl group; $C_p'$ is a di substituted fluorenyl group with substituents at the 3 and 6 positions which are the same, and which are selected from the group consisting of methyl, ethyl, propyl, isopropyl, butyl, isobutyl, tertiary butyl, amyl, isoamyl, hexyl, heptyl, octyl, nonyl, decyl, cetyl, phenyl or trimethyl silyl group, R" is a structural bridge imparting stereorigidity to the component and is a dimethyl silyl group, a diphenyl silyl group, a diphenyl methylene group or an isopropylidene group, M is a group IVB transition metal or vanadium and each Q is a hydrocarbyl group having 1 to 20 carbon atoms or a halogen, and
      2) an aluminum or boron containing co-catalyst component capable of activating the metallocene catalyst component; and
   (b) contacting the activated catalyst of subparagraph (a) with propylene in a reaction zone under polymerization conditions to form a syndiotactic propylene polymer.

17. The process of claim 16 wherein R" is a diphenylmethylidene or an isopropylidene group.

18. The process of claim 17 wherein Q is a halogen.

19. The process of claim 18 wherein the substituents of the disubstituted fluorenyl group are phenyl groups.

20. The process of claim 18 wherein the substituents of the disubstituted fluorenyl group are tertiary butyl groups.

21. The process of claim 20 wherein M is zirconium or titanium and Q is chlorine.

* * * * *